April 14, 1931.    J. J. QUERTINMONT    1,800,902

SUPPLYING FLOAT FOR DRAWING SHEETS OF GLASS

Filed March 14, 1928

Inventor

Jules J. Quertinmont,
W. Schouleur.
Attorney

Patented Apr. 14, 1931

1,800,902

UNITED STATES PATENT OFFICE

JULES J. QUERTINMONT, OF POINT MARION, PENNSYLVANIA

SUPPLYING FLOAT FOR DRAWING SHEETS OF GLASS

Application filed March 14, 1928. Serial No. 261,444.

This invention relates to floats or "debiteuse" which are used in connection with the Fourcault system of drawing continuous sheets of glass, and is an improvement of the float as shown, for example, in my U. S. Patent, No. 1,529,086, dated March 10, 1925, used in connection with a glass furnace similar to that disclosed in my U. S. Patent, No. 1,541,772, dated June 9, 1925.

The objects of the invention are:

First, to provide a supplying-float of the character above indicated in which a sheet of glass is capable of being drawn or formed with a better and more uniform lustre and brilliancy and avoid the formation of a cold line or distortion or waves at any section and throughout the entire width and length of the cooled or finished sheet.

Second, to provide a construction of supplying-float which is embodied with features of construction and instrumentalities to prevent the premature cooling and undesirable and injurious chilling of the molten glass during the drawing operation and issuance from the float and delaying said cooling of the drawn sheet until the same has flowed without any resistance to preserve its natural lustre and permitted to properly set to prevent the formation of distortions of its surface, thickness and width, after leaving the forming opening of the supplying-float.

Third, to provide a supplying-float of the character above indicated in which the longitudinal slot through which the molten glass is drawn is so constructed and arranged with respect to its relation to the cooling means usually placed in proximity to the drawn sheet of glass as it leaves the float, so that said drawn sheet of glass is properly protected or shielded from too rapid and injurious chilling by the cooling means and said cooling means is not effective until the drawn sheet of glass has properly set and is devoid of all possibility of further stretching or displacement of its outer plane surfaces.

Fourth, to provide a construction or attachment which can be readily and quickly applied to existing types of supplying floats at a minimum expense whereby the prior floats will be capable of being converted into the present invention and carry out the advantages of operations and perform all the functions of the same.

Fifth, to construct a supplying-float for drawing sheet glass which will efficiently, quickly, and cheaply achieve all the operations, functions and advantages hereinbefore pointed out and without the use of skilled artisans, careful adjustments, or auxiliary mechanism which involves the use of supplemental heating and cooling of the formed sheet of glass as it passes beyond the provisions connected with the supplying-float.

Sixth, to construct a supplying-float having such characteristics, functions and mode of operation herein recited, which will have a long life and high efficiency, simple in construction, and easily and cheaply manufactured and maintained.

Seventh, other objects and advantages of the improved supplying-float or "debiteuse" will appear from the detailed description of the construction and arrangement of the parts and mode of operation to be hereinafter given.

The invention consists of structural characteristics and relative arrangements of elements which will be hereinafter more fully described and particularly pointed out in the appended claims.

In the drawings, in which similar reference characters indicate the same parts in the several figures, Figure 1 is an enlarged and fragmentary sectional view of a glass furnace, as shown, for example, in my U. S. Patent, No. 1,541,772, and showing the operative position of the improved supplying-float.

Figure 1:
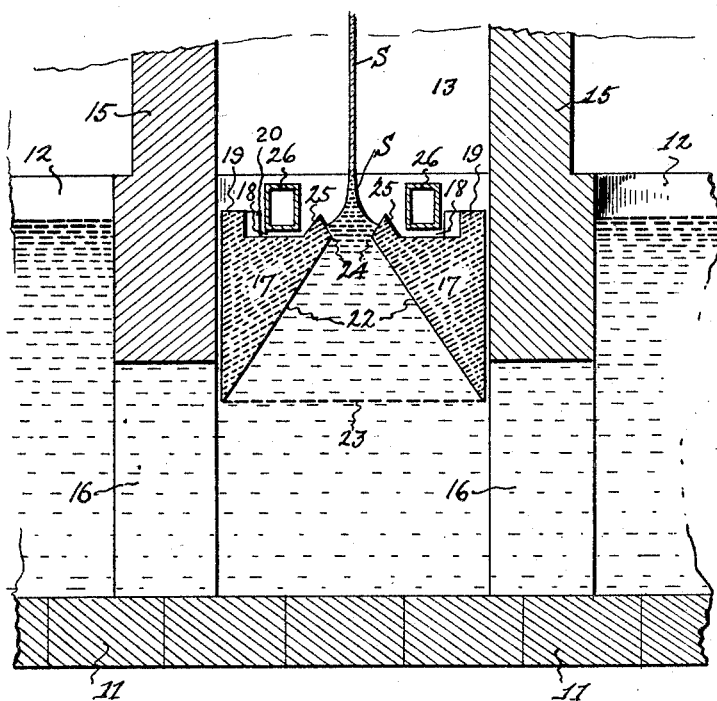

Referring to Figures 1, 2 and 3, 11 is a section of an elongated and narrow drawing tank which is usually subdivided into a series or plurality of alternately arranged reheating chambers 12, and drawing chambers 13, one of which is here shown, said reheating chambers 12 and drawing chambers 13 being separated by walls 15, having openings 16 at their bottom sections to place the adjacent reheating chambers 12 and drawing chambers 13 in communication with each other at their lower portions to permit the molten glass to readily pass or progressively flow from a melting furnace, not shown, as will be readily understood, and which is fully and more clearly shown and described in my former U. S. Patent, No. 1,541,772, herein referred to and forms no part of the present invention.

17 is the improved supplying-float or "debiteuse" disposed and floating in the drawing chamber 13 which is preferably elongated and rectangular in cross section and is provided on its upper side with a rectangular depression or pocket 18 formed by the longitudinal walls 19, 19, and end walls 20, 20, said end walls are partially cut out or removed to form end passages 21, 21, for the purpose of scraping out or removing any broken glass, foreign matter, or splinters which may become detached from the drawn glass or otherwise drop into said pocket or depression 18.

22 is a longitudinal slot arranged in a vertical plane and preferably passing through the longitudinal axis of the supplying-float 17, and is of such a length as to be substantially of the same dimensions as the width of the glass sheet to be drawn, and accordingly varies, depending on what width of glass sheet is to be drawn, as will be readily understood.

Figure 3:
Figure 3 is a longitudinal section taken on line III—III of Figure 2, said cooling conduits being omitted.

The cross-section of said slot 22 varies and, as will be clearly seen from Figures 1 and 3, contracts from its enlarged lower opening 23 to its narrow upper and sheet forming opening 24, and while I have herein shown a particular shape, configuration or cross-section of said slot 22, the same may be easily varied without departing from the present invention.

Adjacent to and along each of the longitudinal edges of the upper opening 24 is provided an integral shielding ridge or protector 25 reduced in cross-sectional area in a plane normal to the slot 22, and having its largest width or base in proximity to the upper opening 24 and forming an outwardly flaring extension of said upper opening 24. Said ridges or protectors 25, 25, project above the plane of said upper opening 24 and depression or pocket 18, and while shown triangular in cross section may be of any other shape or cross section, if so desired, and are so proportioned and disposed to act as shields or protectors of the upwardly moving and newly formed sheet of glass S, as it emerges and is drawn out of the upper opening 24 of the supplying-float, and most effectively prevent the pliable and just formed sheet of glass from becoming prematurely cooled and rapidly and injuriously chilled by the radiation of the cooling medium circulating through the adjacent hollow conduits 26, 26, commonly used in this class of inventions and needing no further disclosure.

These shields or protecting sections or elements of the supplying-float interposed between those portions of the supplying-float which form the newly drawn sheet of glass and the cooling medium or conduits have a most important and novel function of delaying or retarding the cooling of the newly formed sheet of glass and hence avoid the prematurely setting of the glass sheet and permit the natural and uniform lustre, brilliancy and texture of the sheet of glass being firmly and unalterably established before the sheet of glass comes under the influence of said cooling medium or conduits 26, 26.

Figures 4, 5:
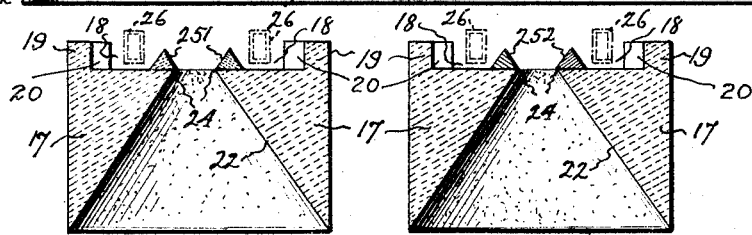
Figures 4 and 5 are transverse sections of modified forms of the float shown in Figure 1, in which the shielding ridges or protectors are separate and independent members.

Figure 4 represents substantially the same form of supplying-float, as shown in Figure 1, in which 221 is the slot having lower opening 231 and upper opening 241, with the exception that the shielding ridges or protectors 251, 251, are separate and independent members capable of being removed or renewed, and may be made of clay, fire brick, asbestos, or other suitable and like material, and disposed and adjusted to assume a variable operative position, as shown in Figure 4, and capable of carrying out all the advantages and functions of the integral ridges or protectors 25, shown in Figure 1.

Figure 5 shows substantially the same form or modification of the invention as described with reference to Figure 4, with the change that the shield or protecting ridges 252, 252, are made of steel, or alloy, or other suitable metals or alloys capable of resisting the high temperature of the furnace.

Figure 6:
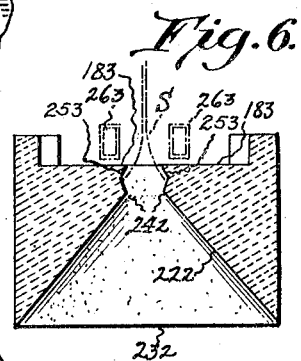
Figure 6 is a transverse section of a modification in which the forming opening is below the upper plane of the supplying-float and the shielding member or protector is made integral with the float.
Figure 2:
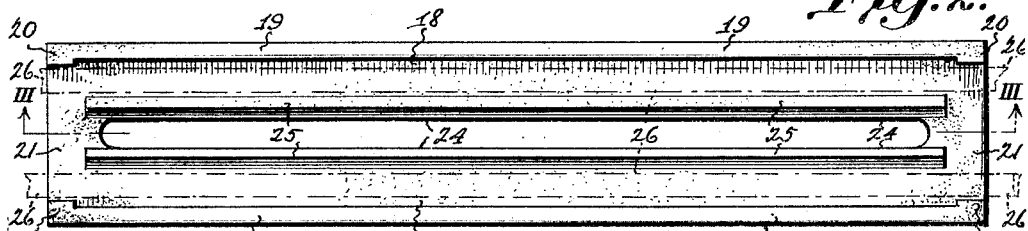
Figure 2 is a top plan of the supplying-float on a slightly reduced scale from that shown in Figure 1, with the cooling conduits shown in dotted lines.

Figure 6 represents a modification of the invention in which the longitudinal slot 222 is provided with the lower opening 232 and an upper contraction or opening 242 for forming the sheet of glass, and the shielding or protecting elements 253, 253 are formed integral with the supplying-float and below the plane of the bottom of the pocket or depression 183, and, as will be seen, the cooling effect of the conduits 263, 263 is delayed until the sheet of glass S, shown in dotted line, is properly and well formed and sufficiently set to resist any injurious effects which could possibly be carried out by said coolers or conduits 263, 263.

From the foregoing description of the construction and arrangement of the different forms of shielding or protecting elements of the supplying-float or "debiteuse", it will be seen that the molten glass is properly drawn and set and later cooled to insure the efficient production of a finished sheet of glass devoid of any distortion, waves, or internal strain, and with a surface of high and uniform lustre and brilliancy throughout both sides of its entire width and length.

Furthermore, it will be seen that all the objects and advantages recited in the statement of invention have been fully and efficiently carried out, and while I have shown several and the preferred forms of the same, it will be understood that many other forms, changes or variations of said shielding or protecting elements will readily suggest themselves without in any way departing from the present invention or evading the scope of the claims.

What I claim is:

1. A supplying-float for drawing a continuous sheet of glass having a depression on its upper side and a longitudinal slot with upper and lower openings, a protecting shield projecting above the upper opening and adjacent to and along each of the longitudinal edges of said upper opening, and each protecting shield reduced in cross-sectional area in a plane normal to the slot and having its largest width or base in proximity to the upper opening and forming an outwardly flaring extension of said opening and a cooling conduit lying within said depression adjacent to the outer side of each of said protecting shields.

2. A supplying-float for drawing a continuous sheet of glass having a depression on its upper side and a longitudinal slot with upper and lower openings, a protecting shield projecting above the plane of the upper opening and adjacent to and along each of the longitudinal edges of said upper opening, and each protecting shield reduced in cross-sectional area in a plane normal to the slot and having its largest width or base in proximity to the upper opening and forming an outwardly flaring extension of said opening and a cooling conduit lying within said depression adjacent to the outer side of each of said protecting shields.

3. A supplying-float for drawing a continuous sheet of glass having a depression on its upper side and a longitudinal slot with upper and lower openings, a shielding ridge projecting above the plane of the upper opening and adjacent to and along each of the longitudinal edges of said upper opening, and each shielding ridge reduced in cross-sectional area in a plane normal to the slot and having its largest width or base in proximity to the upper opening and forming an outwardly flaring extension of said opening and a cooling conduit lying within said depression adjacent to the outer side of each of said protecting shields.

4. A supplying-float for drawing a continuous sheet of glass having a depression on its upper side and a longitudinal slot with upper and lower openings, a separate and independent shield projecting above the plane of the upper opening and capable of being adjusted and disposed adjacent to and along each of the longitudinal edges of said upper opening, and each shield reduced in cross-sectional area in a plane normal to the slot and having its largest width or base in proximity to the upper opening and forming an outwardly flaring extension of said opening and a cooling conduit lying within said depression adjacent to the outer side of each of said protecting shields.

5. A supplying-float for drawing a continuous sheet of glass having a depression on its upper side and a longitudinal slot with upper and lower openings, a separate and independent shielding ridge projecting above the plane of the upper opening and capable of being adjusted and disposed adjacent to and along each of the longitudinal edges of said upper opening, and each shielding ridge reduced in cross-sectional area in a plane normal to the slot and having its largest width or base in proximity to the upper opening and forming an outwardly flaring extension of said opening and a cooling conduit lying within said depression adjacent to the outer side of each of said protecting shields.

6. A supplying-float for drawing a continuous sheet of glass having a depression on its upper side and a longitudinal slot with upper and lower openings, a separate and independent ridge projecting above the plane of the upper opening and capable of being adjusted and disposed adjacent to and along or from each of the longitudinal edges of said upper opening, and each ridge reduced in cross-sectional area in a plane normal to the slot and having its largest width or base in proximity to the upper opening and forming an outwardly flaring extension of said opening and a cooling conduit lying within said depression adjacent to the outer side of said protecting shields.

7. A supplying-float for drawing a continuous sheet of glass having a depression on its upper side and a longitudinal slot with upper and lower openings, a shielding ridge projecting above the plane of the upper opening and adjacent to and along each of the longitudinal edges of said upper opening, the opposing surfaces of the ridges adjacent to the upper opening forming a longitudinal outwardly and upwardly flaring passage connected with said upper opening, and each shielding ridge reduced in cross-sectional area in a plane normal to the slot and having its largest width or base in proximity to the upper opening and a cooling conduit lying within said depression adjacent to the outer side of each of said protecting shields.

In testimony whereof, I hereunto affix my signature.

JULES J. QUERTINMONT.